No. 824,638. PATENTED JUNE 26, 1906.
L. DE FOREST.
OSCILLATION RESPONSIVE DEVICE.
APPLICATION FILED JAN. 20, 1906.

WITNESSES:
Frank H. Parker.
John Buckler.

INVENTOR:
Lee de Forest
by Geo. K. Woodworth
Atty.

UNITED STATES PATENT OFFICE.

LEE DE FOREST, OF NEW YORK, N. Y.

OSCILLATION-RESPONSIVE DEVICE.

No. 824,638.　　　　Specification of Letters Patent.　　Patented June 26, 1906.

Application filed January 20, 1906. Serial No. 296,932.

*To all whom it may concern:*

Be it known that I, LEE DE FOREST, a citizen of the United States, and a resident of New York, in the county of New York and State of New York, have invented a new and useful Improvement in Oscillation-Responsive Devices, of which the following is a specification.

My invention relates to devices for detecting feeble electrical currents or oscillations, in general, and especially such currents or oscillations which are developed in wireless-telegraph receiving systems.

I have discovered that the gaseous medium intervening between two separated electrodes, if put into a condition of molecular activity, will become highly sensitive to electrical oscillations, so that the passage across said medium of electrical oscillations will alter the conductivity thereof and therefore create current variations in a circuit including said electrodes. In an oscillation-responsive device of this type heretofore employed by me the circuit which included the aforesaid electrodes also included a battery or other source of electromotive force and a signal-indicating device. I have discovered, however, that such external source of electromotive force is not essential to the operation of an oscillation-responsive device, the sensitive element of which is a gaseous medium in a condition of molecular activity, inasmuch as the device itself may constitute a source of electromotive force; and I have discovered also that it is not necessary to pass the electrical oscillations to be detected through such gaseous medium, inasmuch as the conductivity of the latter may be altered by passing such oscillations through a solenoid surrounding the same.

The object of the present invention is to provide an oscillation-detector which requires no local battery and which embodies the principles above set forth.

My invention may best be understood by having reference to the drawings which accompany and form a part of this specification and which illustrate diagrammatically simple forms of receivers embodying my invention.

Figure 1:
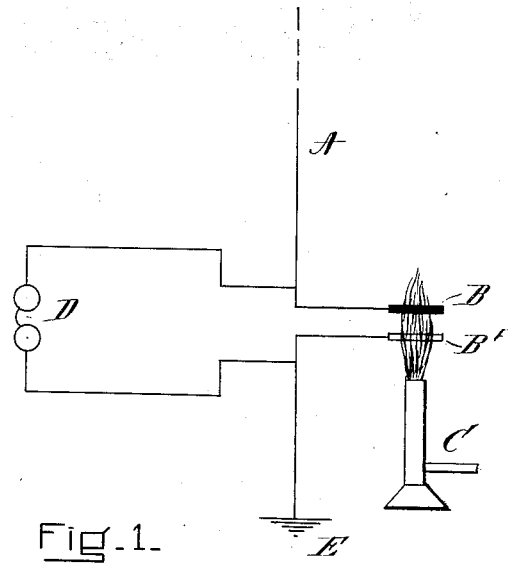
Figure 2:
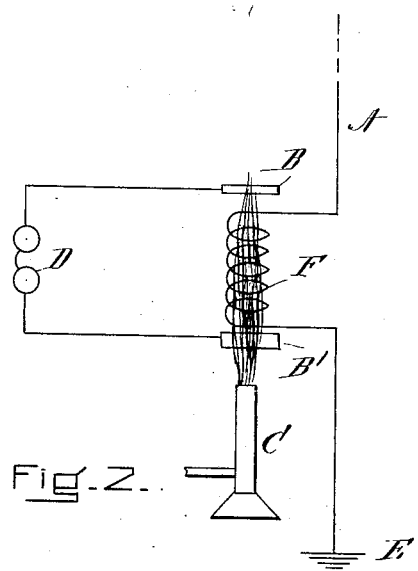

In the drawings, Figure 1 represents an oscillation-responsive device having as its sensitive member a gaseous medium and which requires no external source of electromotive force; and Fig. 2 represents an oscillation-responsive device having as its sensitive member a gaseous medium and in which the oscillations to be detected are not required to pass through such medium.

In Fig. 1, A is an antenna, grounded at E and including the electrodes B B' in series therewith. C is a Bunsen burner, or other suitable source of gaseous combustion, the influence of which includes the electrodes B B'. These electrodes may consist of platinum or carbon or one may be of platinum and the other of carbon. If both electrodes are of the same material, they should preferably be of different sizes and if of different materials they may be of the same or of different sizes. When said electrodes are heated by the flame from the burner or other source of heated gas, C, an electromotive force is developed and creates a current in the local circuit which includes the telephone or other signal indicating device D, the electrodes B B' and the gaseous medium between the said electrodes. When electrical oscillations are developed in the antenna A by electromagnetic signal-waves, the passage of such oscillations through the sensitive gaseous conducting medium between the electrodes B B' alters the conductivity thereof and thereby alters what may be termed the "internal resistance" of the flame-battery constituted by the electrodes B B' and the flame from the burner C. Such change in conductivity in the gaseous medium has the effect of creating current variations in the local circuit which are made manifest in the signal-indicating device D.

In Fig. 2, the electrodes B B' are shown as being different in size and constructed of the same material; F is a solenoid connected in series with the antenna A and surrounding the gaseous medium which forms the sensitive element of the oscillation-responsive device. Said gaseous medium may be produced by any suitable means, and although shown as produced by the flame of a Bunsen burner I do not wish to be limited to such means of producing it, for many other means may be employed. For example, a Crookes or other tube may be used to project a beam of cathode-rays through said solenoid. However the gaseous medium may be produced I find that the passage of electrical oscillations through the solenoid F varies the conductivity of said medium and hence creates current variations in the local circuit which includes the telephone D, and electrodes B B'. As shown in Fig. 2, the electromotive force which creates the local-circuit current is produced by the flame-battery as in Fig. 1; but, if desired, an external battery or other source of electromotive force may be used.

Although I have shown my oscillation-detector connected in series with an antenna, it is obvious that it may be associated with an antenna in any of the ways in which such detectors are commonly employed.

I claim—

1. An oscillation-responsive device, comprising a sensitive gaseous conducting medium and constituting a source of electromotive force.

2. An oscillation-responsive device consisting of a flame-battery.

3. An oscillation-responsive device, comprising two separated electrodes and a source of gaseous combustion including said electrodes within its influence, said electrodes being so constituted as to develop an electromotive force under the action of said combustion.

4. An oscillation-responsive device, comprising a sensitive gaseous conducting medium, a solenoid surrounding the same and means for conveying the oscillations to be detected to said solenoid.

5. An oscillation-responsive device comprising a sensitive gaseous conducting medium, and means whereby the conductivity of said medium may be altered by electrical oscillations without passing the oscillations to be detected therethrough.

In testimony whereof I have hereunto subscribed my name this 17th day of January, 1906.

LEE DE FOREST.

Witnesses:
PHILIP FARNSWORTH,
LESTER TESTUT.